(12) United States Patent
Notley

(10) Patent No.: US 9,914,108 B2
(45) Date of Patent: Mar. 13, 2018

(54) EXFOLIATING LAMINAR MATERIAL BY ULTRASONICATION IN SURFACTANT

(75) Inventor: Shannon Notley, Mont Albert (AU)

(73) Assignee: The Australian National University (AU)

( * ) Notice: Subject to any disclaimer, the term of this patent is extended or adjusted under 35 U.S.C. 154(b) by 684 days.

(21) Appl. No.: 14/233,312

(22) PCT Filed: Jul. 13, 2012

(86) PCT No.: PCT/AU2012/000847
§ 371 (c)(1),
(2), (4) Date: Feb. 27, 2014

(87) PCT Pub. No.: WO2013/010211
PCT Pub. Date: Jan. 24, 2013

(65) Prior Publication Data
US 2014/0226429 A1  Aug. 14, 2014

(30) Foreign Application Priority Data
Jul. 19, 2011 (AU) .................... 2011902876

(51) Int. Cl.
| | |
|---|---|
| *B01J 19/10* | (2006.01) |
| *B82Y 40/00* | (2011.01) |
| *B82Y 30/00* | (2011.01) |
| *C01G 41/00* | (2006.01) |
| *C01B 33/22* | (2006.01) |

(Continued)

(52) U.S. Cl.
CPC .............. *B01J 19/10* (2013.01); *B82Y 30/00* (2013.01); *B82Y 40/00* (2013.01); *C01B 19/007* (2013.01); *C01B 32/19* (2017.08); *C01B 32/23* (2017.08); *C01B 33/22* (2013.01); *C01G 39/06* (2013.01); *C01G 41/00* (2013.01);

(Continued)

(58) Field of Classification Search
USPC ......................................................... 366/118
See application file for complete search history.

(56) References Cited

U.S. PATENT DOCUMENTS

| | | | |
|---|---|---|---|
| 7,824,651 B2 | 11/2010 | Zhamu et al. | |
| 8,287,699 B2 * | 10/2012 | Zhamu | B82Y 30/00 204/157.15 |

(Continued)

OTHER PUBLICATIONS

Seo, Jung-Woo T. et al. "High-Concentration Aqueous Dispersions of Graphene Using Nonionic, Biocompatible Block Copolymers", Apr. 12, 2011, The Journal of Physical Chemistry Letters, vol. 2, pp. 1004-1008 and S-1 to S-7.*

(Continued)

*Primary Examiner* — Abbas Rashid
(74) *Attorney, Agent, or Firm* — Honigman Miller Schwartz and Cohn LLP; Thomas A. Wootton; Jonathan P. O'Brien

(57) ABSTRACT

Disclosed herein is a method for exfoliating a laminar material to form an exfoliated material, in which the laminar material is ultrasonicated in a solution of a surfactant for sufficient time to form the exfoliated material. At all times during the ultrasonication the concentration of the surfactant in the solution is maintained sufficient to form a complete monolayer on the surfaces of the laminar material and the exfoliated material in the solution, or sufficient to sterically stabilize the laminar and exfoliated materials against aggregation.

14 Claims, 4 Drawing Sheets

(51) Int. Cl.
    *C01G 39/06*    (2006.01)
    *C01B 19/00*    (2006.01)
    *C01B 32/23*    (2017.01)
    *C01B 32/19*    (2017.01)
(52) U.S. Cl.
    CPC ...... *C01P 2002/82* (2013.01); *C01P 2002/84* (2013.01); *C01P 2004/04* (2013.01)

(56) References Cited

U.S. PATENT DOCUMENTS

| | | | |
|---|---|---|---|
| 2008/0279756 A1* | 11/2008 | Zhamu | C01B 31/0423 423/448 |
| 2009/0022649 A1* | 1/2009 | Zhamu | B82Y 30/00 423/415.1 |
| 2010/0147188 A1 | 6/2010 | Mamak et al. | |
| 2010/0273060 A1* | 10/2010 | Yang | B82Y 10/00 429/231.8 |
| 2011/0017585 A1* | 1/2011 | Zhamu | B82Y 30/00 204/157.42 |
| 2011/0037033 A1* | 2/2011 | Green | B03D 3/00 252/510 |
| 2011/0311432 A1* | 12/2011 | Pu | B82Y 30/00 423/460 |

OTHER PUBLICATIONS

DuPont. DuPont™ Zonyl® Fluorosurfactants. 2007. pp. 1-6. <http://www2.dupont.com/Capstone/en_US/assets/downloads/K17445_Oil_field_Brochure_1.1-7.pdf>. Retrieved Mar. 30, 2017.*

DuPont. DuPont198 Zonyl® FSO. 2008. pp. 1-2. <http://evonik.tego.de/pdf/daten/amer/zonyl_fso.pdf>. Retrieved Mar. 30, 2017.*

J-W. T. Seo et al., "High-Concentration Aqueous Dispersions of Graphene Using Nonionic, Biocompatible Block Copolymers", The Journal of Physical Chemistry Letters, 2:1004-1008, 2011.

Sheng-Zhen Zu and Bao-Hang Han, "Aqueous Dispersion of Graphene Sheets Stabilized by Pluronic Copolymers: Formation of Supramolecular Hydrogel", J. Phys. Chem. C, 113:13651-13657, 2009.

* cited by examiner (a)

(b) (c)

(d)

(a) (b)

EXFOLIATING LAMINAR MATERIAL BY ULTRASONICATION IN SURFACTANT

TECHNICAL FIELD

The present invention relates to processes for preparing suspensions of exfoliated materials and to suspensions made thereby.

PRIORITY

This application claims priority from PCT application PCT/AU2012/000847, filed on Jul. 13, 2012, which claims priority from Australian provisional application AU2011902876, filed Jul. 19, 2011, the entire contents of which are incorporated herein by cross-reference.

BACKGROUND

There is considerable commercial interest in nano-particles and suspensions thereof. Graphene in particular has shown promise due to its interesting electronic, thermal and mechanical properties. Graphene comprises sheets of an extended carbocyclic aromatic network and may be regarded as an exfoliated graphite. The use of graphene in commercial applications has however been limited due to the relatively small amounts that are produced using conventional techniques. Also, graphene sheets have a strong tendency to aggregate even in suspension. This problem increases with increasing concentration of the graphene in the suspension. Similar problems pertain to other materials which consist of platelets or sheets, such as talc, clays etc.

Aggregation of platelets or sheets in suspension may be inhibited by use of surfactants. However many surfactants can desorb from the surface of exfoliated sheets, leading to aggregation and possibly instability of the suspension. Furthermore, if the exfoliated sheets are dried, resuspension is generally difficult due to reaggregation. Resuspended materials may require sonication in order to re-exfoliate the material.

OBJECT OF THE INVENTION

It is an object of the present invention to substantially overcome or at least ameliorate one or more of the above disadvantages.

SUMMARY

In a first aspect of the invention there is provided a method for exfoliating a laminar material to form an exfoliated material, said method comprising ultrasonicating said laminar material in a solution of a surfactant for sufficient time to form said exfoliated material. At all times during the ultrasonication the concentration of the surfactant in the solution should be maintained sufficient to form a complete monolayer on the surfaces of the laminar material and the exfoliated material in the solution, or sufficient to sterically stabilise the laminar and exfoliated materials against aggregation. In some cases the monomer is monomeric. In such cases the process may comprise continuously adding the surfactant so as to maintain the sufficient concentration. In other cases the surfactant is polymeric. In such cases the process may comprise continuously or intermittently adding the surfactant so as to maintain the sufficient concentration or it may comprise adding sufficient surfactant before the ultrasonicating that at all times during the ultrasonication the concentration of the surfactant in the solution is maintained sufficient to form a complete monolayer on the surfaces of the laminar material and the exfoliated material in the solution, or sufficient to sterically stabilise the laminar and exfoliated materials against aggregation.

The following options may be used in conjunction with the first aspect, either individually or in any suitable combination.

The surfactant may be polymeric. The surfactant may be a non-ionic surfactant. It may be a copolymer of ethylene oxide and propylene oxide. It may have a dγ/dc value of less than about 0 $Nm^{-1} \cdot mol^{-1} \cdot L$, or may be from about −0.1 to about −5 $Nm^{-1} \cdot mol^{-1} \cdot L$. The dγ/dc may be in water or in some other solvent in which the exfoliation is performed.

At all times during the ultrasonication the concentration of the surfactant in the solution may be sufficient to form a complete monolayer on the surfaces of the laminar material and the exfoliated material in the solution, or sufficient to sterically stabilise the laminar and exfoliated materials against aggregation. In some embodiments the concentration of the surfactant in the solution prior to the ultrasonicating is sufficient to form a complete monolayer on the surface of the exfoliated material which is formed from the laminar material in the solution, or sufficient to sterically stabilise the exfoliated material against aggregation. Alternatively (or additionally) the surfactant may be added to the solution during the ultrasonicating at a rate sufficient that at all times during the ultrasonication the concentration of surfactant in the solution is sufficient to form a complete monolayer on the surfaces of the laminar material and the exfoliated material in the solution, or sufficient to sterically stabilise the laminar and exfoliated materials against aggregation.

The concentration and nature of the surfactant may be such that at all times during the ultrasonication the surface tension of the solution is approximately the same as the interfacial tension of the solution and the exfoliated material.

The solution may be an aqueous solution. It may have no organic cosolvents therein, or in some instances it may have one or more organic (e.g. alcoholic) cosolvents.

The laminar material may be graphite. In this case the exfoliated material may be graphene.

The method may additionally comprise drying the solution having the exfoliated material therein. It may further comprise resuspending the exfoliated material in a solvent. In this context, "drying" refers to removal of volatile species, in particular solvent, from the solution, commonly by evaporation.

In an embodiment there is provided a method for exfoliating a laminar material, for example graphite, to form an exfoliated material (in the case where the laminar material is graphite, the exfoliated material will be graphene), said method comprising ultrasonicating said laminar material in an aqueous solution of a surfactant which is a copolymer of ethylene oxide and propylene oxide for sufficient time to form said exfoliated material, wherein at all times during the ultrasonication the concentration of the surfactant in the solution is sufficient to form a complete monolayer on the surfaces of the laminar material and the exfoliated material in the solution.

In a second aspect of the invention there is provided a suspension of an exfoliated material in a solution of a surfactant, optionally a polymeric surfactant.

The suspension may resist reaggregation of the exfoliated material, or may resist separation of solids, for at least about 3 months, or at least about 1 year.

In a third aspect of the invention there is provided a dried exfoliated material, the surface of said exfoliated material being substantially completely coated in a surfactant, optionally a polymeric surfactant. The exfoliated material may be suspendable in a liquid without substantial aggregation of the exfoliated material. It may be suspendable without ultrasonication in a liquid without substantial aggregation of the exfoliated material.

In the suspension of the second aspect or the dried exfoliated material of the third aspect the surfactant may be a non-ionic surfactant. It may be a copolymer of ethylene oxide and propylene oxide. It may have a $d\gamma/dc$ value of less than about 0. The exfoliated material may be graphene.

In a fourth aspect of the invention there is provided use of a surfactant, optionally a polymeric surfactant, in the exfoliation, e.g. the ultrasonically promoted exfoliation, of a laminar material to form an exfoliated material.

The use of the surfactant may be in sufficient quantity to form a complete monolayer on the surfaces of the laminar material and the exfoliated material in the solution. It may be in sufficient quantity to sterically stabilise the laminar and exfoliated materials against aggregation. It may be in a concentration of about 0.5 to about 5 mg surfactant per $m^2$ of exfoliated material The surfactant may be a non-ionic surfactant. It may be a copolymer of ethylene oxide and propylene oxide. It may have a $d\gamma/dc$ value of less than about 0.

The laminar material may be graphite. In this case the exfoliated material may be graphene.

BRIEF DESCRIPTION OF THE DRAWINGS

Embodiment of the present invention will now be described, by way of example only, with reference to the accompanying drawings wherein.

DETAILED DESCRIPTION

Figure 1:
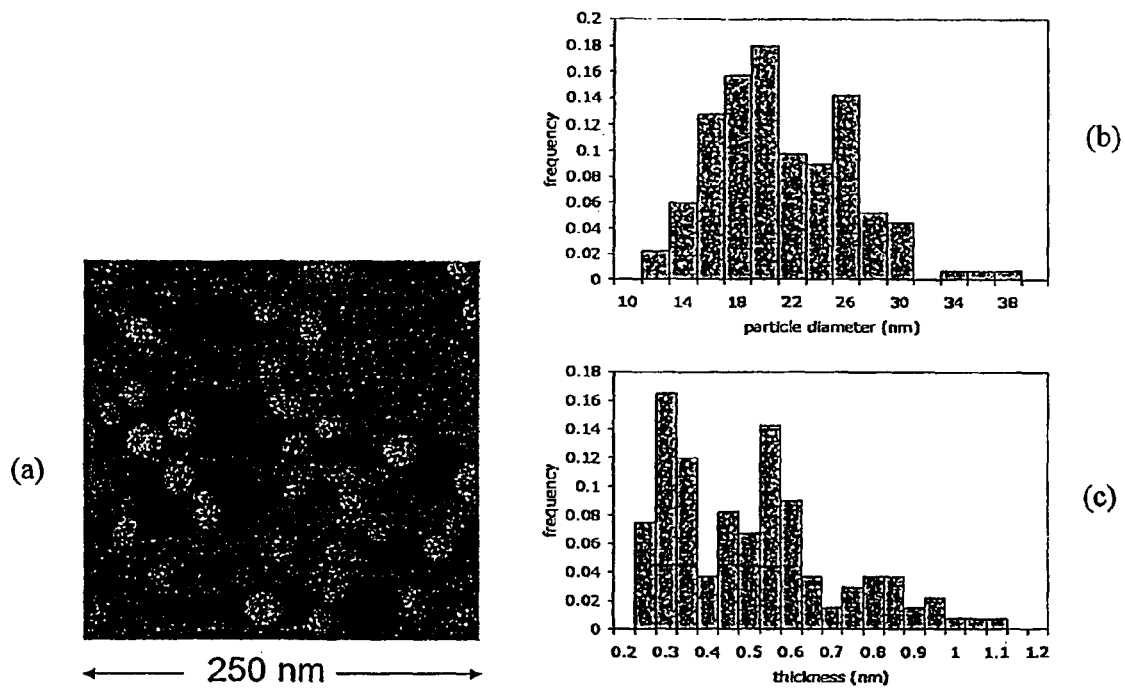
FIG. 1 shows graphene particles size distributions following exfoliation of graphite using CTAB (cetyltrimethylammonium bromide) as surfactant with a solution concentration of 0.6 mM and initial graphite concentration of 1% w/w. The exfoliated suspension was centrifuged at 1500 g for 5 minutes: (a) non-contact mode atomic force microscopy image of a graphene flake deposited onto a mica surface. (b) height variation of graphene and particles and (c) size distribution of graphene particles.

The method of the present invention enables production of highly concentrated stabilised graphene and other and exfoliated mineral suspensions. It may be applied to any suitable laminar material, for example graphite, molybdenite, tungstite, talc, $WS_2$, $MoS_2$, BiTe, mica etc. or to mixtures of such materials.

It is known that ultrasonication of laminar materials such as graphite, clays, molybdenite, talc etc. in suspension in a liquid can promote exfoliation of these materials. In the context of the present specification, "exfoliation" refers to the separation of a laminar material into its constituent laminae. These laminae are referred to variously as "sheets" or "platelets". In particular, the separated sheets produced by exfoliation of graphite are referred to as graphene. Although ideally graphene consists only of monolayer sheets, in the context of the present specification, slightly aggregated material, for example having up to 10 layered sheets, or having mixtures of different aggregation numbers in which the average is up to 10 (or up to 5 or up to 3), is also encompassed by the term "graphene". Correspondingly, a "laminar" material is taken to refer to a material comprising particles comprising aggregated laminae and an "exfoliated" material to refer to a material comprising particles of the deaggregated laminae. The laminae in a laminar material are commonly adhered together by relatively weak Van der Waals forces. Typically in a laminar material there will be a large number of aggregated sheets. There will be more than 10, and commonly more than $10^3$, $10^4$, $10^5$ or $10^6$ aggregated sheets. An exfoliated material produced by the method of the present invention may be completely exfoliated (i.e. no laminae are aggregated) or may be partially exfoliated (i.e. some laminae are aggregated but the degree of aggregation is reduced relative to the laminar material). The degree of aggregation in general depends on the ratio between the initial concentration of graphite to the concentration of surfactant. The inventor has demonstrated greater than 80% conversion of graphite to single and few layer (less than 10 layers) graphene. Commonly a 40% conversion is easily achievable. This conversion may be measured gravimetrically after centrifugation of the exfoliated suspension. Thus a known weight of suspension is dried and then re-weighed to determine the percentage conversion. It should be noted that this method entails some minor inaccuracy, although this may be reduced by weighing the material which is not exfoliated, i.e. the graphitic material left over rather than the few layer material exfoliated and stabilised with surfactant. A second method for measuring the degree of conversion to determine the mass of graphene through the use the density of the suspension. Once again there is some inaccuracy but much less that the earlier described method. The density of the surfactant is about 1.05 (compared to water of about 0.99 and graphene of about 2.25). This second method is the quicker and easier.

The inventor hypothesises the following mechanism for exfoliation in the method described in the present specification. During ultrasonication of a liquid, cavitation can lead to transient vapour filled bubbles in the liquid. In order to promote exfoliation of a laminar material in the sonicated solution, it is useful to maintain the interfacial tension between the solution and the laminae at around the same value (e.g. within about 20%, or within about 15, 10 or 5%) as the surface tension of the solution (i.e. the interfacial tension between the solution and the vapour in the bubbles). This equates to a requirement that the liquid-vapour interfacial energy is comparable to the energy required to separate the laminae beyond the range of the Van der Waals forces. As sonication proceeds, laminae are forced apart, leaving a cavity between them. This will be filled with vapour of the solvent (as there is nothing else to fill it). If it is energetically favourable for the solution to be in contact with the laminae at the side of this cavity, it can flow in and insert itself between the laminae. At this stage, the surfactants can attach to the surfaces of the laminae so as to inhibit approach of other laminae to these surfaces and thereby inhibit reaggregation. Thus two surface energies can be defined, one for delamination and the other for breaking of covalent linkages between carbon atoms within a sheet. The liquid-vapour interfacial energy should be comparable to the energy required to separate the sheets beyond the range of the Van der Waals forces. As exfoliation proceeds, the interfacial surface area between the laminae and the solution increases due to the separation of laminae from each other (which exposes the separated surfaces to the solution). As surfactant adsorbs onto the exposed surfaces of the laminae, it becomes depleted from the solution. It is not uncommon for 1 g of laminar material to produce a surface area once fully exfoliated of about 30000 $m^2$. The higher the value of $d\gamma/dc$ (i.e. the rate of change of surface tension with concentration of surfactant) of the surfactant, the more this will change the balance between the interfacial tension between the solution and the laminae and the surface tension of the solution. This can inhibit the exfoliation process. It is therefore preferable to use surfactants having low $d\gamma/dc$ so as to minimise this effect. A suitable value of $d\gamma/dc$ is below about $0\ Nm^{-}\cdot mol^{-1}\cdot L$. It may be less than about $-0.1, -0.5, -1, -2, -3, -4$ or $-5\ Nm^{-1}\cdot mol^{-1}\cdot L$, or it may be from about 0 to $-5\ Nm^{-1}\cdot mol^{-1}\cdot L$ or about $-0.1$ to $-5$, $-0.5$ to $-5$, $-1$ to $-5$, $-2$ to $-5$, 0 to $-2$, 0 to $-1$, 0 to 0.5, 0 to 0.1, 0.1 to $-5$, $-0.5$ to $-2$, $-0.5$ to $-1$ or $-1$ to $-3$, e.g. about 0, $-0.1, -0.2, -0.3, -0.4, -0.5, -0.6, -0.7, -0.8, -0.9, -1, -1.5, -2, -2.5, -3, -3.5, -4, -4.5$ or $-5\ Nm^{-1}\cdot mol^{-1}\cdot L$.

It should be noted that the present specification makes repeated mention of a "solution". The solution contains dissolved surfactant. It may also contain surfactant micelles, which are aggregates of surfactant molecules. It may also be a suspension, containing suspended laminae and/or aggregates thereof.

Mineral suspensions have in the past been prepared using monomeric surfactants. These are frequently characterised by a relatively low critical micelle concentration (cmc), resulting in a relatively low concentration of dissolved surfactant. They also are commonly characterised by a relatively high change in aqueous surface tension with concentration ($d\gamma/dc$).

The inventor has found that polymeric surfactants can be selected to have the appropriate value of $d\gamma/dc$ and also an appropriate cmc for stabilisation throughout the exfoliation process. The cmc of the surfactant may be greater than about 1 mM, or greater than about 1.5, 2, 2.5 or 3 mM, or may be about 1 to about 5 mM, or about 1 to 3, 1 to 4, 1.5 to 5, 2 to 5, 1.5 to 3 or 2 to 4 mM, e.g. about 0.5, 1, 1.5, 2, 2.5, 3, 3.5, 4, 4.5 or 5 mM. For comparison, CTAB (a monomeric surfactant) has a cmc of about 0.9 mM and poloxamer 338 (a suitable polymeric surfactant) has a cmc of about 3 mM. In this context, the term "polymeric" is taken to indicate a degree of polymerisation of greater than 10.

The use of a polymeric surfactant has several advantages. The fact that the surfactant molecule has a large hydrophobic group increases its attractiveness for the surface of the laminae, reducing the chance that the surfactant will desorb from the surface. Also, the fact that the surfactant molecule has a large hydrophilic group provides steric stabilisation by preventing close approach of exfoliated laminae in suspension. This reduces the chances of reaggregation of the exfoliated laminae.

The polymeric surfactant used in the present invention may have a molecular weight (number average or weight average) of about 500 to about 50000, or about 500 to 10000, 500 to 5000, 500 to 1000, 1000 to 50000, 10000 to 50000, 1000 to 10000, 1000 to 5000 or 5000 to 10000, e.g. about 500, 600, 700, 800, 900, 1000, 1500, 2000, 2500, 3000, 3500, 4000, 4500, 5000, 6000, 7000, 8000, 9000, 10000, 15000, 20000, 25000, 30000, 35000, 40000, 45000 or 50000. It may have a narrow molecular weight range or a broad molecular weight range. The ratio Mw/Mn may be greater than about 1.1, or greater than about 1.2, 1.3, 1.4, 1.5, 2, 3, 4 or 5, or it may be less than about 5, or less than about 4, 3, 2, 1.5 or 1.2. It may for example be about 1.1, 1.2, 1.3, 1.4, 1.5, 2, 2.5, 3, 3.5, 4, 4.5 or 5. It may have a degree of polymerisation of about 10 to about 1000, or about 10 to 500, 10 to 200, 10 to 100, 10 to 50, 20 to 1000, 50 to 1000, 100 to 1000, 500 to 1000, 20 to 200, 20 to 100 or 100 to 200, e.g. about 10, 15, 20, 25, 30, 35, 40, 45, 50, 60, 70, 80, 90, 100, 150, 200, 250, 300, 350, 400, 450, 500, 600, 700, 800, 900 or 1000. Mixtures of surfactants may be used. In this case, at least one of the surfactants, optionally all, of the surfactants may be polymeric as described above. Monomeric surfactants may also be used in some instances—these have lower molecular weights than those described above for polymeric surfactants. They may be capable of reducing the surface tension of water as are the polymeric surfactants.

The surfactant may be a non-ionic surfactant, or it may be a cationic surfactant or it may be an anionic surfactant or it may be a zwitterionic surfactant. Ionic and zwitterionic surfactants have the advantage that they are less temperature sensitive than non-ionic surfactants, which can change their surfactant properties when heated above a critical temperature. However non-ionic surfactants have the advantage that they are less sensitive to pH and to the presence of ionic species in the liquid. In the present invention, if non-ionic surfactants are used, the method should be conducted at a temperature below that at which the polar head group of the surfactant dehydrates. This temperature is characteristic of each individual surfactant and may be readily determined by experiment (or may be found in the open literature for many common surfactants). The use of non-ionic surfactants has been shown to be effective in the present invention even in the presence of up to 1M sodium chloride.

The surfactant may be a copolymer. It may be an ethylene oxide-propylene oxide copolymer. It may have other comonomers or may have no other comonomers. It may be an amine having one or more (optionally 3) ethylene oxide-propylene oxide copolymer substituents on the nitrogen atom. It may be a block copolymer. It may be a triblock copolymer. It may be an ethylene oxide-propylene oxide block copolymer. It may be a poloxamer. It may be an ethylene oxide-propylene oxide-ethylene oxide triblock copolymer. The two ethylene oxide blocks may be the same length or may be different lengths. The proportion of ethylene oxide in the polymer may be about 10 to about 90% by weight or mole, or about 10 to 50, 10 to 30, 50 to 90, 70 to 90, 20 to 80, 20 to 50, 50 to 80, 20 to 40 or 60 to 80%, e.g. about 10, 20, 30, 40, 50, 60, 70, 80 or 90%.

The surfactant may have an HLB (hydrophilic/lipophilic balance) of greater than about 6, or greater than about 7, 8, 10, 12, 15 or 20, or of about 6, 7, 8, 9, 10, 11, 12, 13, 14, 15, 16, 17, 18, 19, 20, 21, 22, 23, 24 or greater than 24. Suitable surfactants which may be used in the present invention include Pluronic® P123 (nominally $HO(CH_2CH_2O)_{20}(CH_2CH(CH_3)O)_{70}(CH_2CH_2O)_{20}H$:HLB about 7), Pluronic® L31 (nominally $HO(CH_2CH_2O)_2(CH_2CH(CH_3)O)_{16}(CH_2CH_2O)_2H$: HLB about 1-7), Pluronic® F127 (nominally HO(CH$_2$CH$_2$O)$_{101}$(CH$_2$CH(CH$_3$)O)$_{56}$(CH$_2$CH$_2$O)$_{101}$H: HLB about 22) and Pluronic® F108 HO(C$_2$H$_4$O)$_{141}$(C$_3$H$_6$O)$_{44}$(C$_2$H$_4$O)$_{141}$H: (nominally HLB>24). In general, surfactants having higher HLB also have higher cloud point. Commonly surfactants with HLB over about 12 have a cloud point over about 100° C. In many embodiments of the present invention, the suspension is in a liquid having a boiling point of 100° C. or less (commonly water). Accordingly, the surfactant may have an HLB of greater than 12 so as to ensure that the cloud point is not exceeded. Alternatively, in some cases, the surfactant may have HLB of about 1 to about 7, or about 1 to 5, 1 to 3, 3 to 7, 5 to 7 or 3 to 5, e.g. about 1, 2, 3, 4, 5, 6 or 7. In general, a higher HLB is preferable so as to better stabilise the dispersion. The surfactant may be a non-foaming surfactant. Examples of suitable surfactants for use in the present invention include alkyl trimethylammonium halides (e.g. bromides) having an alkyl chain length of 12, 14 or 16 and poloxamers having molecular weights from about 1 to about 20 kDa and HLB of greater than about 6. The use of a polymeric surfactant improves stability of the prepared suspension, particularly against dilution and changes in solution conditions. This is a significant advantage over monomeric surfactants such as CTAB. The continuous addition strategy can be used with any type of surfactant, either monomeric or polymeric.

The inventor has surprisingly found no surfactant, whether monomeric or polymeric, ionic or non-ionic, that does not function so as to improve the concentration of graphene produced from graphite according to the present invention, provided that a solution of the surfactant can be produced to lower the surface tension to the optimum range. For example, all alkylammonium surfactants tested (both single and double chain, irrespective of counterion-ion such as bromide, chloride and acetate) were effective, as were polyethylene oxide alkylethers, a range of Brij® surfactants, Tween® surfactants and polysorbates (polymeric non-ionics e.g. Tween® 80). SPAN® 80 (or Arlacel®, which is a sorbitan monooleate) was also effective. All of these surfactants are far more soluble in water than required in order to reach the necessary low surface tension and therefore are able to be used in the continuous addition strategy discussed later in this specification. The inventor considers that the resultant amount of exfoliated material is ultimately limited by the solubility of the surfactant. However, as mentioned in the document, the ability to add a "dry" or neat surfactant (i.e. not in solution) removes this limitation also.

In the process of the invention a solution containing suspended aggregates is ultrasonicated. The initial solution (which is also a suspension) may be prepared by dissolving a surfactant in a suitable liquid, commonly an aqueous liquid (e.g. water) and adding the laminar material. The concentration of the surfactant may be sufficient to achieve a surface tension of about 35 to 45 mJ·m$^2$, or about 35 to 40, 40 to 45, 38 to 43 or 40 to 43 mJ·m$^{-2}$, e.g. about 35, 36, 37, 38, 39, 40, 41, 42, 43, 44 or 45 mJ·m$^2$. It may be sufficient to completely coat the exfoliated material, preferably the completely exfoliated material. The concentration will depend on the surfactant, e.g. on one or more of the molecular weight, monomer molecular weight and HLB. It may also depend on the nature and amount of laminar material to be exfoliated. It may be for example from about 0.01 to about 1% w/v, or about 0.05 to 1, 0.1 to 1, 0.5 to 1, 0.01 to 0.5, 0.01 to 0.1, 0.01 to 0.05, 0.1 to 0.5 or 0.05 to 0.5%, e.g. about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1% w/v.

Agitation (e.g. stirring, swirling, shaking etc.) of the resultant mixture leads to suspension of the laminar material in the solution. This is then ultrasonicated using suitable ultrasonication equipment. Examples of suitable equipment include stand alone probes and horns with variable tip dimensions that can be inserted into the suspension or flow cell (e.g. QSONICA®-Q700). The equipment may be suitable for scale up of the process. The ultrasonication may have a power of greater than about 10 W, or greater than about 20, 50, 100, 200, 500 or 1000 W, or may be about 10 to about 1000 W, or about 10 to 500, 10 to 200, 10 to 100, 10 to 50, 50 to 1000, 50 to 100, 100 to 1000, 200 to 1000, 500 to 1000, 100 to 500, 300 to 700 or 500 to 800 W, e.g. about 10, 20, 30, 40, 50, 60, 70, 80, 90, 100, 150, 200, 250, 300, 350, 400, 450, 500, 600, 700, 800, 900 or 1000 W. It may have a frequency of greater than about 2 kHz, or greater than about 5, 10, 20, 50, 100, 150 or 200 kHz, or about 2 to about 200 kHz, or about 2 to 100, 2 to 50, 2 to 20, 2 to 10, 10 to 200, 20 to 200, 50 to 200, 100 to 200, 10 to 100, 50 to 100 or 10 to 50 kHz, e.g. about 2, 3, 4, 5, 6, 7, 8, 9, 10, 15, 20, 25, 30, 35, 40, 45, 50, 60, 70, 80, 90, 100, 120, 140, 160, 180 or 200 kHz. A suitable ultrasonication condition may be for example about 50-100 W at about 10 to 50 kHz. The ultrasonication may be continued for sufficient time to achieve the desired degree of exfoliation. A suitable time may be for example at least about 0.5 minutes, or at least about 1, 2, 5, 10, 15, 20, 30, 40, 50 to 60 minutes, or about 0.5 to about 60 minutes, or about 0.5 to 30, 0.5 to 10, 0.5 to 2, 0.5 to 1, 1 to 60, 2 to 60, 5 to 60, 10 to 60, 30 to 60, 1 to 30, 1 to 10, 1 to 5, 5 to 30, 10 to 30, 10 to 20 or 5 to 15 minutes, e.g. about 0.5, 1, 2, 3, 4, 5, 10, 15, 20, 25, 30, 35, 40, 45, 50, 55 or 60 minutes. It may be less than about 30 minutes, or less than about 25, 20 or 15 minutes. In some instances ultrasonication itself may provide the agitation required to prepare a suspension and no separate agitation may be required.

As discussed above, depletion of the surfactant as the exfoliation proceeds can be a problem. One means to alleviate this problem is by choice of a suitable surfactant as described above. Another, complementary, means is to ensure that the concentration of surfactant is sufficient throughout the sonication to stabilise the suspension, which, as the exfoliation proceeds, contains an increasing proportion of exfoliated material. This may be achieved in two ways.

Firstly a surfactant concentration may be used which is sufficient to stabilise the completely exfoliated material, and preferably also to maintain a sufficient concentration of surfactant in solution towards the end of the sonication that the interfacial tension of the solution is comparable to the surface energy of the laminae. This may be up to 20 times the concentration of the laminar material prior to sonication on a weight basis, or up to about 15, 10, 5 or 2 times the concentration of the laminar material, for example between about 2 and about 20 times the concentration of the laminar material, or about 2 to 10, 2 to 5, 5 to 20, 10 to 20, 5 to 15, 5 to 10 or 10 to 15 times the concentration of the laminar material, e.g. about 2, 3, 4, 5, 6, 7, 8, 9, 10, 11, 12, 13, 14, 15, 16, 17, 18, 19 or 20 times the concentration of the laminar material. The actual ratio will depend on the characteristics of the surfactant, including molecular weight and cross-sectional area, as well as on the nature of the laminar material, in particular its density. Monomeric surfactants have in the past commonly been used in low concentration (commonly millimolar range). If one bases a concentration on concentration of monomer units, such concentrations are inadequate for the surfactants and processes of the present invention. The concentration of surfactant may be sufficient to form a complete monolayer on the surfaces of the laminar material and the exfoliated material in the solution. It may be sufficient to stabilise (optionally sterically stabilise) the laminar and exfoliated material against aggregation. It may be in the range of about 0.5 to about 5 mg surfactant/$m^2$ of exfoliated material, or about 0.8 to about 2 mg/$m^2$, depending on the surfactant. Suitable concentrations may be about 0.5 to 2, 1 to 5, 2 to 5, 0.8 to 1.5, 0.8 to 1, 1 to 1.5, 1.5 to 2 or 1 to 2 mg/$m^2$, e.g. about 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5 or 5 mg/$m^2$. The surface area of graphene is typically about 6000 $m^2$/g and thus for exfoliation of graphite to graphene, a typical surfactant concentration would be about 3 to about 30 g surfactant per gram of graphite. The surfactant adsorbed may be expressed as the difference between the mass added to the suspension and that remaining in solution through depletion adsorption techniques. The concentration of surfactant in solution can be determined from surface tension isotherms, from the density of solution, or through titration. Stabilisation of the particles through the adsorption of surfactant or polymer can be determined optically from sedimentation experiments.

Secondly, surfactant may be fed to the solution during the exfoliation process so that at any time during that process the surfactant concentration is sufficient to stabilise the mixture of laminar material and exfoliated material at that time, and preferably also to maintain a sufficient concentration of surfactant in solution that the interfacial tension of the solution is comparable to the surface energy of the laminae. The surfactant may be fed continuously to the solution or it may be fed discontinuously, i.e. in discrete separate additions. The surfactant may be fed in neat form or in solution, preferably concentrated solution, so as to reduce the addition rate required. Commonly a solid surfactant will be fed as a concentrated solution or micellar solution, and a liquid surfactant will be fed neat, however this need not necessarily be the case. The solution prior to sonication will in general require some surfactant to be present, so as to stabilise the suspension of the laminar material and promote early exfoliation. The addition of the surfactant through the course of the ultrasonication may be such at the completion of the ultrasonication the concentration of surfactant is sufficient to form a complete monolayer on the surfaces of the exfoliated material in the solution. In the continuous addition process the rate of addition of surfactant may typically be at a rate of about 1 to about 10 wt % relative to laminar material per minute, or of about 0.1 to 1 wt %/minute. Thus for example for a batch of 5 g graphite in water (e.g. in 100 ml water), the surfactant may be added at a rate of about 0.05 g (=1% of 5 g) to about 0.5 g (=10% of 5 g) per minute or of about 5 mg (=0.1% of 5 g) to about 50 mg (=1% of 5 g) per minute. Addition rates may be about 0.1 to 10, 0.1 to 1, 0.1 to 0.5, 0.1 to 0.2, 0.2 to 0.5, 0.5 to 1, 0.5 to 5, 1 to 5, 1 to 2, to 10, 5 to 10 or 3 to 6 wt %/minute, e.g. about 0.1, 0.2, 0.3, 0.4, 0.5, 0.6, 0.7, 0.8, 0.9, 1, 2, 3, 4, 5, 6, 7, 8, 9 or 10 wt %/minute. The addition may be for about 0.5 to about 5 hours, or about 0.5 to 2, 0.5 to 1, 1 to 5, 2 to 5 or 1 to 3 hours, e.g. about 0.5, 0.6, 0.7, 0.8, 0.9, 1, 1.5, 2, 2.5, 3, 3.5, 4, 4.5 or 5 hours, but may be more or less than these values. The addition may be continuous or may be a batchwise equivalent to the above rates. The addition may be continued for sufficient time to achieve the desired degree of exfoliation. The addition of surfactant may be accompanied by continuous sonication or by intermittent sonication. The rate of addition may be different for different surfactants, and may be based upon the $d\gamma/dc$ value and initial concentration of the surfactant solution added. For example, using Pluronic® F108 with an initial concentration of 10% w/w added to 100 mL of graphite suspension, the rate of addition would be around 1.2 mL/min.

More generally, it is necessary to add surfactant at a rate sufficient to keep the surface tension of the solution below a desired threshold value above which further exfoliation fails to occur. It will be understood that, as exfoliation proceeds, the surface area of the suspended solids (laminar and exfoliated materials) increases as the surfaces of the lamina are revealed to the solution. As surfactant molecules adsorb to the newly revealed surfaces, the concentration of surfactant in solution drops and the surface tension of the solution increases. In order to support exfoliation the solution must have a surface tension below a certain threshold value. Thus if the initial concentration of surfactant is insufficient, after a time exfoliation will cease due to the depletion of dissolved surfactant. Thus surfactant should be added at a rate sufficient to allow this to occur. It may be added at a rate comparable to its removal from solution by adsorption to exfoliated material.

Commonly the threshold value of surface tension is between about 45 and 50 mJ/$m^2$, and may be about 45 to 48, 47 to 50 or 48 to 50 mJ/$m^2$, e.g. about 45, 46, 47, 48, 49 or 50 mJ/$m^2$.

A suitable method for determining the rate of addition of surfactant is as follows.

1. The surface tension of the liquid phase (water) is measured as a function of concentration of surfactant and the concentration region identified corresponding to the surface tension of between a lower value (C1) and an expected threshold value (C2e, commonly corresponding to surface tension above about 48-50 mJ/$m^2$).

2. Surfactant is first added to a suspension of laminar material to produce a liquid of about concentration C1.

3. Sonication of the suspension is commenced and samples are removed at regular time intervals. The surface tension of the liquid phase is determined as a function of time from commencement of sonication.

4. A calibration curve (see for example FIG. 3) is produced form the data obtained in step 3, which shows the surface tension of the solution as a result of surfactant consumed through adsorption to the exfoliated material as a function of time.

5. The time (T1) at which exfoliation ceases can be determined by observing plateauing of the surface tension/time curve from step 4. The concentration at that time is the threshold value C2.

6. Surfactant is replaced at the minimum rate of consumption. (C1−C2)/T1.

Commonly the lower value C1 is less than about 45 mJ/$m^2$, or less than about 44, 43, 42, 41 or 4045 mJ/$m^2$, or about 35 to about 45 mJ/$m^2$, or about 38 to 45, 40 to 45, 35 to 43, 35 to 40, 38 to 42 or 40 to 42 mJ/$m^2$, e.g. about 35, 36, 37, 38, 39, 40, 41, 42, 43, 44 or 45 mJ/$m^2$. The threshold value (C2e, C2) is commonly above 45 mJ/$m^2$, or above 46, 47, 48, 49 or 50, or between about 45 and 55, or about 45 to 50, 50 to 55, 48 to 52 to 47 to 40, e.g. about 45, 46, 47, 48, 49, 50, 51, 52, 53, 54 or 55 mJ/$m^2$.

Thus in an embodiment of the method of the invention there is provided a method for exfoliating a laminar material to form an exfoliated material, said method comprising:

a) preparing a solution of a surfactant in water at a concentration sufficient for the solution to have a first surface tension, said first surface tension being below a threshold surface tension above which ultrasonication does not support exfoliation of the laminar material;

b) adding a quantity of the laminar material to the solution to form a suspension;

c) ultrasonicating the suspension and determining the surface tension of the suspension as a function of time from commencement of ultrasonication;

d) determining from the results of step c) a threshold surface tension, being the surface tension at which a curve of surface tension against time ceases to trend upwards;

e) determining a time T required to achieve the threshold surface tension under the conditions of step c);

f) preparing a second suspension having sufficient of the surfactant to achieve the first surface tension and comprising the laminar material; and g) ultrasonicating said suspension under the same conditions of ultrasonication as in step c), while adding the surfactant at a rate of (C1−C2)/T, wherein C1 is the concentration of the surfactant required to achieve the first surface tension and C2 is a concentration of the surfactant required to achieve the threshold surface tension.

Step g) may be conducted for sufficient time to achieve the required degree of exfoliation (e.g. at least about 50%, or at least about 30, 40, 50, 60, 70, 80, 90, 95 or 99%). At all times during step (g) the concentration of the surfactant in the solution may be sufficient to form a complete monolayer on the surfaces of the laminar material and the exfoliated material in the solution, or sufficient to sterically stabilise the laminar and exfoliated materials against aggregation. The various options described earlier in respect of the first aspect of the invention may also be applied, where appropriate, to this embodiment.

The method may comprise determining the relationship between concentration of the surfactant in an aqueous solution thereof and surface tension of said solution so as to determine C1 and C2. It will be noted that the value of the first surface tension may be determined by the experience of a skilled worker, but if necessary may be determined by routine experimentation.

The process of the invention is commonly conducted under ambient conditions, i.e. atmospheric pressure and about 20 to 25° C., however these conditions may be varied if required. It is known that non-ionic surfactants can change their surfactant properties when heated to sufficient temperature to dehydrate the polar head group. The process is commonly conducted below that temperature. The solution may increase in temperature as the exfoliation proceeds due to input of energy from the ultrasonication. It may therefore be cooled, e.g. by means of a water bath or other suitable means, in order to prevent excess heating. The exfoliated material produced by the present invention may resist reaggregation of the exfoliated material for at least about 24 hours, due to the steric stabilisation provided by the surfactant. This effect is particularly noticeable when a polymeric surfactant is used, and is in general increased when high HLB polymeric surfactants are used. In some instances the exfoliated material may resist reaggregation for at least about 2, 3, 4, 5, 6, 7, 14, 21 or 28 days, or at least about 1, 2, 3, 4, 5, 6, 7, 8, 9, 10 or 11 months, or at least about 1, 1.25, 1.5, 1.75, 2, 3, 4 or 5 years, or indefinitely. The exfoliated material may be isolated from the solution. This may be accomplished by known methods such as centrifugation, ultracentrifugation, filtration, microfiltration, ultrafiltration, evaporation etc. On an industrial scale, freeze or spray drying may also be used, as may the use of a hydrocyclone for defined particle sizes. Prior to the separation free surfactant may be at least partially removed, e.g. by dialysis, if required. A characteristic of the present process is that the exfoliated material resists aggregation even in high concentrations and when dried. Consequently the dried exfoliated material may be stored without substantial reaggregation. It may be resuspended in a solvent, again without substantial reaggregation, even without the use of ultrasonication. The solvent may be any suitable solvent, for example an aqueous solvent or a non-aqueous solvent. It may be water, an alcohol (e.g. ethanol, methanol, isopropanol etc.), a ketone (e.g. acetone, methyl ethyl ketone), an ether (e.g. diethyl ether) and ester (e.g. ethyl acetate), toluene or any other suitable solvent, or may be a mixture of any two or more of the above suitable solvents that are miscible with each other. It may be a polar or moderately polar solvent or mixture of solvents. It may be an aromatic solvent or a mixture of an aromatic with another solvent as described above.

The process described herein may be suitable for preparation of stable suspensions of exfoliated materials at a concentration of up to about 10%, or up to about 5, 2 or 1%, on a w/w or w/v basis. In this context "stable" refers to a suspension that resists physical separation of the solids for at least about 3 months, or at least 6 or 9 months, or at least about 1, 2, 3, 4 or 5 years.

Thus a method for the production of concentrated nanoparticulate suspensions of mineral materials such as graphene, talc, molybdenite and clays is described. Any platelet mineral held together ostensibly through van der Waals forces can be exfoliated to provide 2 dimensional sheets of monolayer thickness using ultrasound. The suspension is prepared in an aqueous solution of surfactant and subjected to ultrasonic agitation. The surfactant has a dual role. Firstly, it lowers the surface tension of the liquid to match the surface energy of the mineral of choice, so as to facilitate exfoliation. Secondly, it adsorbs to the surface of the particles, providing a repulsive barrier to reaggregation (steric stabilisation).

The choice of surfactant is important in the stabilisation of the exfoliated material. Previously published reports use surfactants with low critical micelle concentrations and relatively high changes in aqueous surface tension with concentration ($d\gamma/dc$). The inventor has instead chosen to use, as a representative example, a poloxamer (these are nonionic triblock copolymers having a hydrophobic chain of polyoxypropylene (poly(propylene oxide)) between two hydrophilic chains of polyoxyethylene (poly(ethylene oxide)) e.g. Pluronic® surfactants from BASF) which has a high critical micelle concentration and low $d\gamma/dc$. This second point is very important. The large increase in available interfacial area upon ultrasonic exfoliation means that the surfactant is rapidly depleted from solution. As this surfactant concentration decreases, the surface tension can increase outside of the range in which exfoliation occurs, hence limiting the production and concentration of single layer mineral materials. Using the poloxamer surfactant enables a much greater concentration of particles than has previously been described using this batch technique.

Furthermore, the inventor has recognised that single monolayer 2D materials can be continuously produced if the surface tension of the solution phase remains in a limit close to the interfacial energy of the mineral during ultrasonic exfoliation. Hence, continuous addition of surfactant to the suspension as a function of particle production may result in much higher concentrations of exfoliated particles, at least an order of magnitude greater, than using the simple batch based technique. It may result in concentrations 200 to 300 times higher, or at times up to 1000 times higher or even more.

The concentration of particles can also be increased through simple evaporation of the aqueous solvent. This can be accomplished without substantial reaggregation.

The poloxamer surfactant sterically stabilises the particles effectively, allowing very high concentrations of the mineral materials to be suspended in water. Furthermore, the particles can be completely dried and redispersed again without significant reaggregation.

There is considerable commercial interest in nanoparticles. The present invention provides a process suitable for large scale, solution based processing so as to provide high concentrations of graphene and other nanoparticles. Possible applications include the production of thin, transparent, conducting films. Furthermore, other applications include:
- use as a load bearing component in nano-composite materials,
- use as a pigment in coatings (as they are in some instances strongly heat absorbing),
- use as a solid phase in smart fluids,
- use in cation binding or exchanging for removal of heavy metals and/or radioactive isotopic ions from aqueous solution,
- use as rheology modifiers in aqueous suspensions and emulsions due to their unique structure,
- use as additives in food, pharmaceutical and agricultural products (many suitable block co-polymer surfactants have FDA and EPA approval),
- use as a component of carbon foams or aerogels/xerogel with high strength and heat resistance,
- use in flame retardant paints and coatings.

EXAMPLES

Example 1

Experimental Detail of the Preparation of Highly Concentrated Graphene Suspensions in Water Using Ultrasonic Exfoliation Two methods have been employed to produce single and multilayer graphene sheets under aqueous conditions. The first is a batch process where a single addition of surfactant was added prior to the production of graphene using ultrasonic exfoliation. The second method involves the continuous addition of surfactant during the exfoliation process. Both of these methods are detailed below.

Method 1: Batch Process for Graphene Exfoliation

A range of surfactants have been studied which are suitable for the reduction of the liquid-vapour interfacial tension to the prescribed range of 40-43 mJm$^{-2}$. These include the cationic surfactants tetradecyltrimethylammonium chloride (TTAB), hexadecyltrimethylammonium chloride (CTAB), the anionic surfactant sodium dodecylsufate (SDS) and ionic surfactants commonly known as poloxamers, which are block co-polymer surfactants (ABA type) with PEO-PPO-PEO architecture with varying block lengths up to a total molecular mass of 14300 Da. Solutions were prepared in pure water to give the desired surface tension. For example, when using CTAB, the optimum concentration is 6×10$^{-4}$ molL$^{-1}$ and for the pluronic F108, a concentration of 0.1% w/w was used.

Milli-Q® grade water was used in all experiments to prepare solutions and suspensions. Commercially available graphite powder (synthetic flakes of 20 μm dimensions) was purchased from Sigma-Aldrich®. The procedure for preparing the graphene is given below.
1. A 1% w/w suspension of the graphite powder in the surfactant solution of appropriate concentration to achieve the optimum surface tension range was prepared. In an example, 0.1% w/w of Pluronic® F108 or Pluronic® F127 in water provided a surface tension of 41 mJ/m$^2$. For CTAB, a concentration of 0.6 mM was used. Thus, for Pluronic® F108, 1 g of graphite was added to 98.9 g of water and 0.1 g Pluronic® F108 surfactant.
2. The flask containing graphite powder, surfactant and water was placed in to the sonicator chamber. The probe was inserted into the suspension.
3. Ultrasonication was carried out using a sonicator "Cell Disruptor"® Model W-220F from Heat Systems-Ultrasonics Inc. The samples were sonicated for a maximum of 15 minutes (typically about 5 minutes) with a power of 60 W.
4. Nano-particulate single layer graphene and multilayer graphene were produced during this sonication.
5. The suspension was allowed to cool to room temperature and was subsequently centrifuged to sediment any large particles or non-delaminated graphite.
6. Centrifugation rates equivalent to 1500 times the force of gravity (i.e. 1500 G) were used for 5 minutes. Under these conditions, a distribution of particles thicknesses was observed. Typically, greater than 95% of particles consisted of three layers or less. Approximately 40% of these particles were single layer graphene. Higher rates of centrifugation equivalent to 2500 G for 30 minutes resulted in a narrower distribution consisting of 90% single layer graphene. However with greater sedimentation, the overall yield was reduced. The lateral dimensions of the particles were typically in the range of 20-60 nm irrespective of centrifugation time and rate. The size of the particles was determined form Atomic Force Microscopy imaging and an example distribution is shown in FIG. 1.
7. Yield was determined both gravimetrically and by measurement of density. A known volume of suspension was pipetted into a pre-weighed sample container. The container was re-weighed after the evaporation of the water through drying in an oven at 110° C.
8. The density of the suspension was also used as a method for determining the concentration. An Anton-Parr DMA density meter was used.

Figure 2:
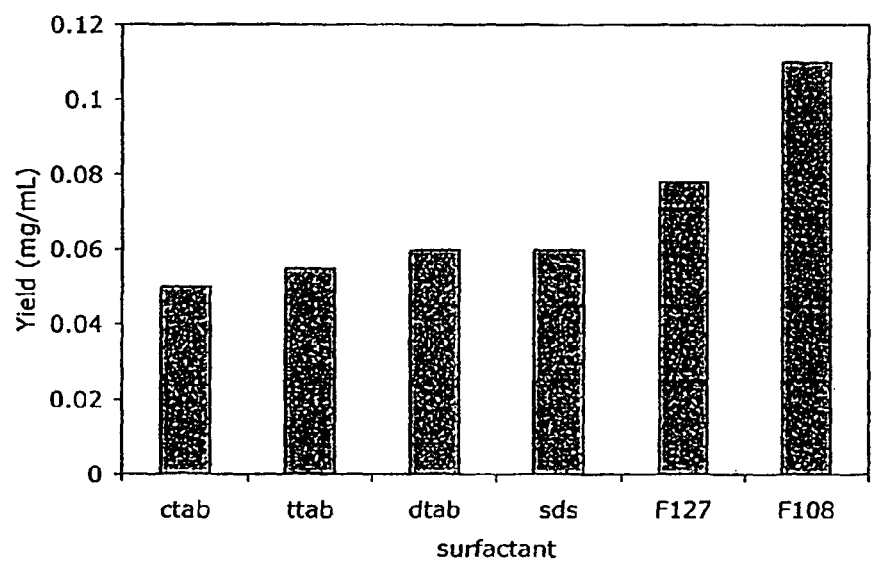
FIG. 2 is a graph showing yield of graphene for different surfactants. The concentration of the surfactants varied depending on the optimum value required for adjusting the surface tension.

As stated above, a number of surfactants have been used in the exfoliation process. The yield after 15 minutes exfoliation and centrifugation at 1500 G for 5 minutes is shown in FIG. 2 for the surfactants investigated so far. The data is arranged in order of lowest critical micelle concentration to highest. It is clear that higher cmc surfactants, i.e. the polymeric surfactants, provided higher yields of exfoliated material.

Figure 3:
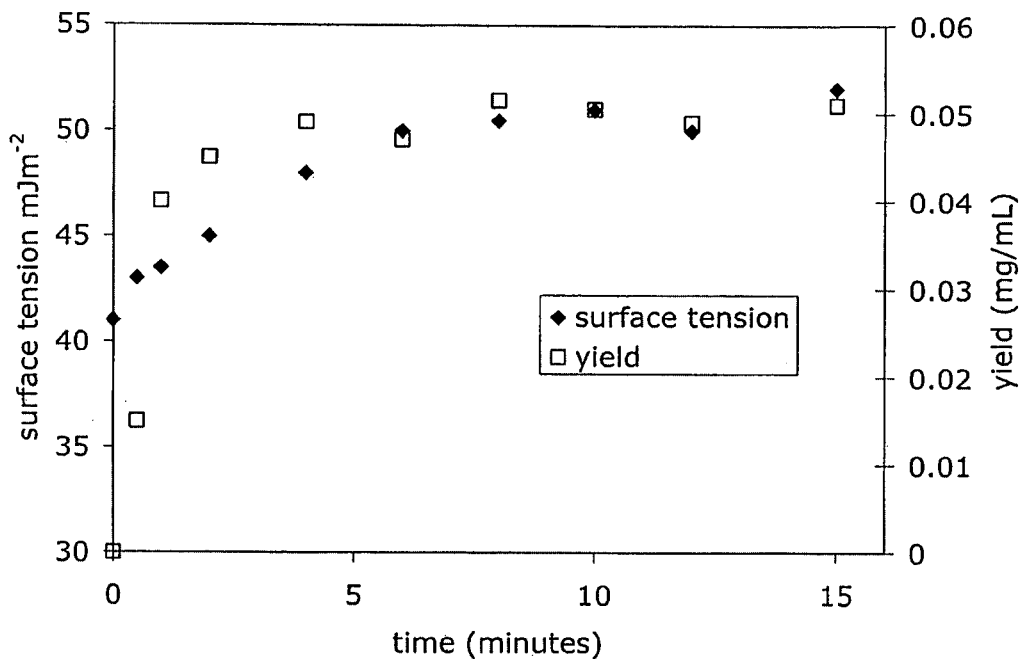
FIG. 3 is a graph showing surface tension of the suspension and yield of graphene produced as a function of the ultrasonic exfoliation time. CTAB was used as surfactant.

The surface tension of the suspension as a function of exfoliation time was also investigated. FIG. 3 shows that the surface tension increases during the sonication process indicating that there is a decrease in the available surfactant in solution. CTAB was used as the surfactant, and the yield was also determined as a function of exfoliation time.

Summary of Batch Results

Clearly, there are a number of factors which influence the yield of graphene produced. The type of surfactant has a distinct influence. Surfactants with higher critical micelle concentrations (and hence lower dγ/dc) give greater concentrations of exfoliated graphene. Furthermore, the time of exfoliation has a significant influence. Here, the correlation between yield produced, surface tension and time indicates that the surfactant is depleted from solution. Thus, a second method, outlined below, was developed involving the continuous addition of surfactant to give higher overall concentrations of graphene.

Method 2: Graphene Exfoliation Using Continuous Addition of Surfactant

Building on from method 1, surfactant was added during the exfoliation procedure.

Figure 4:
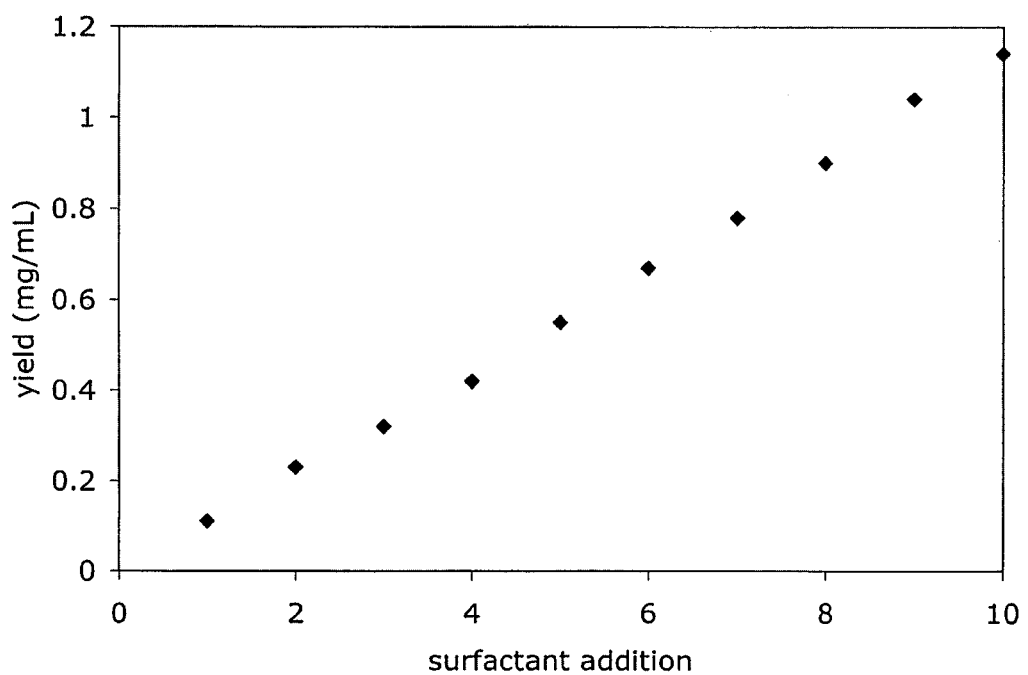
FIG. 4 is a graph showing yield of graphene produced as a function of the addition of F108 Pluronic® (poloxamer 338: $HO(C_2H_4O)_{141}(C_3H_6O)_{44}(C_2H_4O)_{141}H$) surfactant. An appropriate amount of surfactant was added after measuring the surface tension to reduce the surface tension to the optimum range for exfoliation.

1. Initially, after 5 minutes of sonication, the surface tension of the aqueous phase was measured. Surfactant was then added to the suspension in order to reduce the surface tension into the optimum range of 40-43 mJm$^{-2}$.
2. The sonication procedure was continued for a further 5 minutes. The surface tension was once again measured and adjusted back into the optimum range through addition of more surfactant.
3. This procedure was repeated 10 times. The yield as a function of surfactant addition is shown in FIG. 4.

Subsequently, a continuous addition of surfactant through feeding of a solution into the sonication chamber was developed.

1. A suspension of 5% w/w graphene in water was prepared to give a final mass of 100 grams.
2. In a typical experiment, a surfactant solution equivalent to 100 times the amount required for the batch process in method 1 was also prepared in pure water.
3. The sonication under the same conditions as described above was continually applied to the suspension as the surfactant solution was fed through a tube under gravity into the suspension flask. The flow rate could easily be adjusted through the height differential and is furthermore dependent upon the viscosity of the solution. For the Pluronic® F108 surfactant solution, a concentration of 10% w/w was used. 100 mL of this solution was supplied to the suspension at a rate of 2 mL/minute.
4. After 50 minutes, the sonication was stopped and the suspension cooled to room temperature.
5. The resultant suspension was centrifuged as described in method 1.
6. A concentration of graphene of 0.9% w/w was determined gravimetrically and through density measurements of the suspension.
7. This concentration represents a conversion of about 35% of the graphite to single and few layer graphene.

It should be noted that the concentration is reduced as the surfactant solution effectively dilutes the overall content of graphite/graphene. A process where dry surfactant is added continuously is also contemplated. This allows a greater conversion of graphite to graphene to be achieved and furthermore, higher concentrations.

The stabilised graphene nanoparticles produced using the method described above show remarkable robustness against re-aggregation. The polymeric surfactant is important in this respect. Upon dialysing the suspension of graphene nanoparticles, the exfoliated material re-aggregates rapidly (within hours in Milli-Q® water) as the monomeric surfactants tend to desorb from the surface. The polymeric non-ionic surfactants do not readily desorb under most normal solution conditions, and resist high salt concentrations (greater than 1 M) and pH of 2-13. Concentrated acid or base can lead to desorption or high temperature for those surfactants with cloud points less than 100° C. The concentration of the resulting suspensions can be increased through simply evaporating the solvent (water). Suspensions with concentrations greater than 10% w/w can easily be prepared in this way. In practice significantly higher concentrations may be achieved. The inventor has reduced the water content of the suspension using a rotary evaporator to less than about 20% with no observable aggregation (determined through dilution and subsequent turbidity measurements). If totally dried, i.e. 0% water, about 90% of the to material can be re-dispersed with only a mild shaking or sonication (less than 30 s at low powers). It therefore appears that up to 100% solids may be achieveable without significant aggregation.

Furthermore, the particles can be completely dried and re-dispersed in aqueous suspension. Tests show that more than 90% of the dried graphene particles can be re-dispersed. Furthermore, the dried graphene particles have been added to a number of organic solvents including ethanol and toluene with success. Simple alkanes such as hexane do not allow the particles to be redispersed.

Example 2

Production of Aqueous Suspensions of Exfoliated $WS_2$ Particles $WS_2$ nanoparticle suspensions were prepared using the surfactant assisted ultrasonic exfoliation technique as previously described. A 2% w/w suspension of bulk $WS_2$ was added to Milli-Q® water. Under continuous sonication at 60 W using a "Cell Disruptor"® Model W-220F (Heat Systems-Ultrasonics Inc.) sonicator, non-ionic surfactant was added from a highly concentrated solution to maintain the concentration of surfactant in water at approximately 0.1% w/w. The exfoliation procedure results in a vast increase in solid-liquid surface area which leads to rapid depletion of the surfactant through adsorption to the particles surface. Thus, continuously adding surfactant during sonication leads to a significantly greater yield of nanoparticulate $WS_2$. This concentration of surfactant is suitable for maintaining the optimum surface tension as described previously at ~40-42 mJ/m$^2$.

The resultant exfoliated suspension was then dialysed in Milli-Q® water for 48 hours to remove any non-adsorbed surfactant from the solution. The suspension was then centrifuged at 1500 rpm for 5 minutes to sediment further any large (non-exfoliated) particles. The supernatant was collected and was found to be stable for up to 3 months. Some sedimentation was observed due to the relatively high density of $WS_2$ (7.5 g/mL) but the particles could be readily re-dispersed through simple agitation. The particles were subsequently characterised in terms of size, charge and spectroscopic properties as described below. The yield of single and few layer $WS_2$ nanoparticles produced using this method was determined gravimetrically to be as high as 0.2-0.25 mg/mL.

Figure 5:
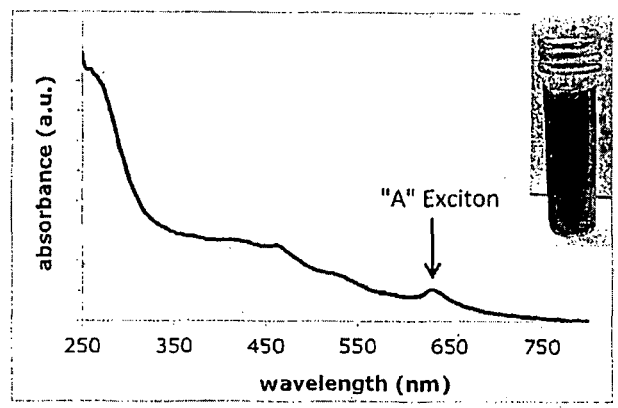
FIG. 5 shows characterisation of exfoliated $WS_2$ particles by (a) Raman Spectroscopy, (b) TEM, (c) electron diffraction and (d) UV-Vis spectrophotometry.
Figure 5:
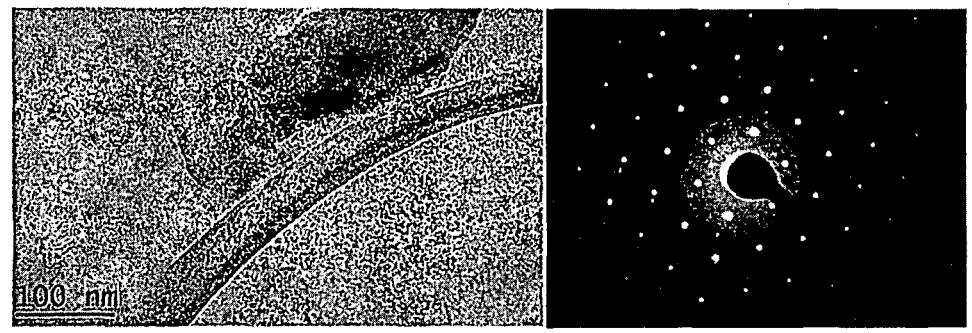
Figure 5:
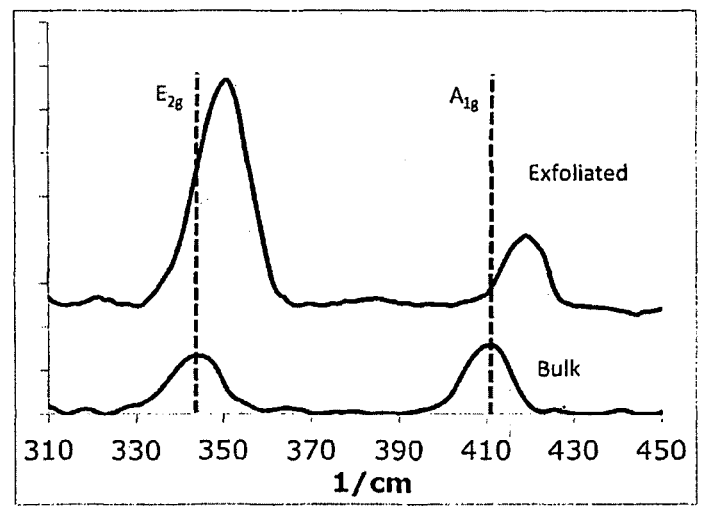

These particles were characterised using Raman Spectroscopy, TEM, electron diffraction and UV-Vis spectrophotometry as shown in FIG. 5.

Production of Aqueous Suspensions of Exfoliated Talc Particles

Single and few layered talc was produced using the surfactant assisted exfoliation technique. Talc (2 g) was added to 100 mL of Milli-Q® water. Surfactant (Pluronic® F108) was added throughout the exfoliation by continuous sonication at 60 W. Typically, a F108 solution in water with a concentration of 10% w/w was used and added at a rate of 1 mL per minute which maintained the concentration of surfactant in the suspension at 0.1% w/w. This concentration reduced the surface tension of the liquid phase to the region of 40-42 mJ/m$^2$.

Figure 6:
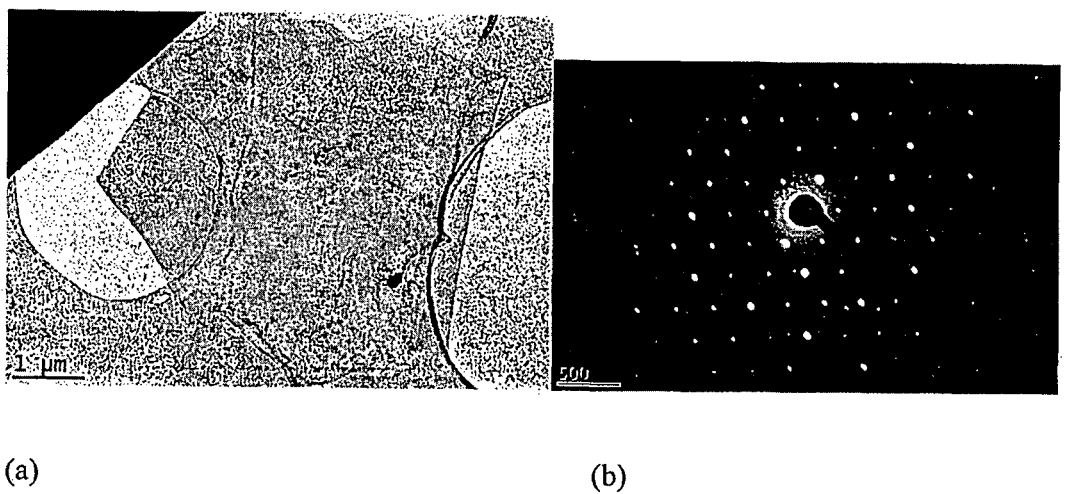
FIG. 6 shows characterisation of exfoliated talc particles by (a) TEM and (b) electron diffraction

The suspension was subsequently dialysed for a minimum of 48 hours and centrifuged at 1500 rpm for 5 minutes to remove large particles. The single and few layered talc particles were characterised using TEM and electron diffraction as shown in FIG. 6. The yield of talc was typically 1.2 to 1.5 mg/mL which was measured gravimetrically.

What is claimed is:

1. A method for exfoliating a laminar material to form an exfoliated material, said method comprising ultrasonicating said laminar material in a solution of a surfactant, wherein said solution of a surfactant has a concentration of the surfactant in the solution sufficient to achieve and maintain a surface tension of 35 to 45 mJ·m$^{-2}$, for sufficient time to form said exfoliated material, wherein at all times during the ultrasonication the concentration of the surfactant in the solution is maintained sufficient to maintain the surface tension of 35 to 45 mJ·m$^{-2}$ in order to form a complete monolayer on the entire surface of the laminar material and the exfoliated material in the solution, said laminar material comprising particles comprising aggregated laminae and said exfoliated material comprising particles of the laminae which have been deaggregated and said method achieving a degree of exfoliation of at least 30%.

2. The method of claim 1 wherein the concentration is 0.5 to 5 mg surfactant per m$^2$ of exfoliated material.

3. The method of claim 1 wherein the surfactant is a polymeric surfactant.

4. The method of claim 1 wherein the surfactant is a non-ionic surfactant.

5. The method of claim 3 wherein the surfactant is a copolymer of ethylene oxide and propylene oxide.

6. The method of claim 1 wherein the surfactant has a dγ/dc value of less than 0.

7. The method of claim 1 wherein the laminar material is graphite and the exfoliated material is graphene.

8. The method of claim 1 wherein the concentration of the surfactant in the solution prior to the ultrasonicating is sufficient to form a complete monolayer on the surface of the exfoliated material which is formed from the laminar material in the solution.

9. The method of claim 1 wherein the concentration of the surfactant in the solution prior to the ultrasonicating is sufficient to sterically stabilise the laminar and exfoliated materials against aggregation.

10. The method of claim 1 wherein the surfactant is added to the solution during the ultrasonicating at a rate sufficient that at all times during the ultrasonication the concentration of surfactant in the solution is sufficient to form a complete monolayer on the surface of the laminar material and the exfoliated material in the solution.

11. The method of claim 1 wherein at all times during the ultrasonication the concentration and nature of the surfactant are such that the surface tension of the solution is approximately the same as the interfacial tension of the solution and the exfoliated material.

12. The method of claim 1 wherein the solution is an aqueous solution.

13. The method of claim 1 additionally comprising drying the solution having the exfoliated material therein.

14. The method of claim 13 comprising resuspending the exfoliated material in a solvent.

* * * * *